Oct. 1, 1963
R. J. JOHNSTON
3,105,912
REVERSIBLE COUNTER WITH SINGLE INPUT THE POLARITY OF WHICH DETERMINES DIRECTION OF COUNT
Filed Jan. 8, 1960
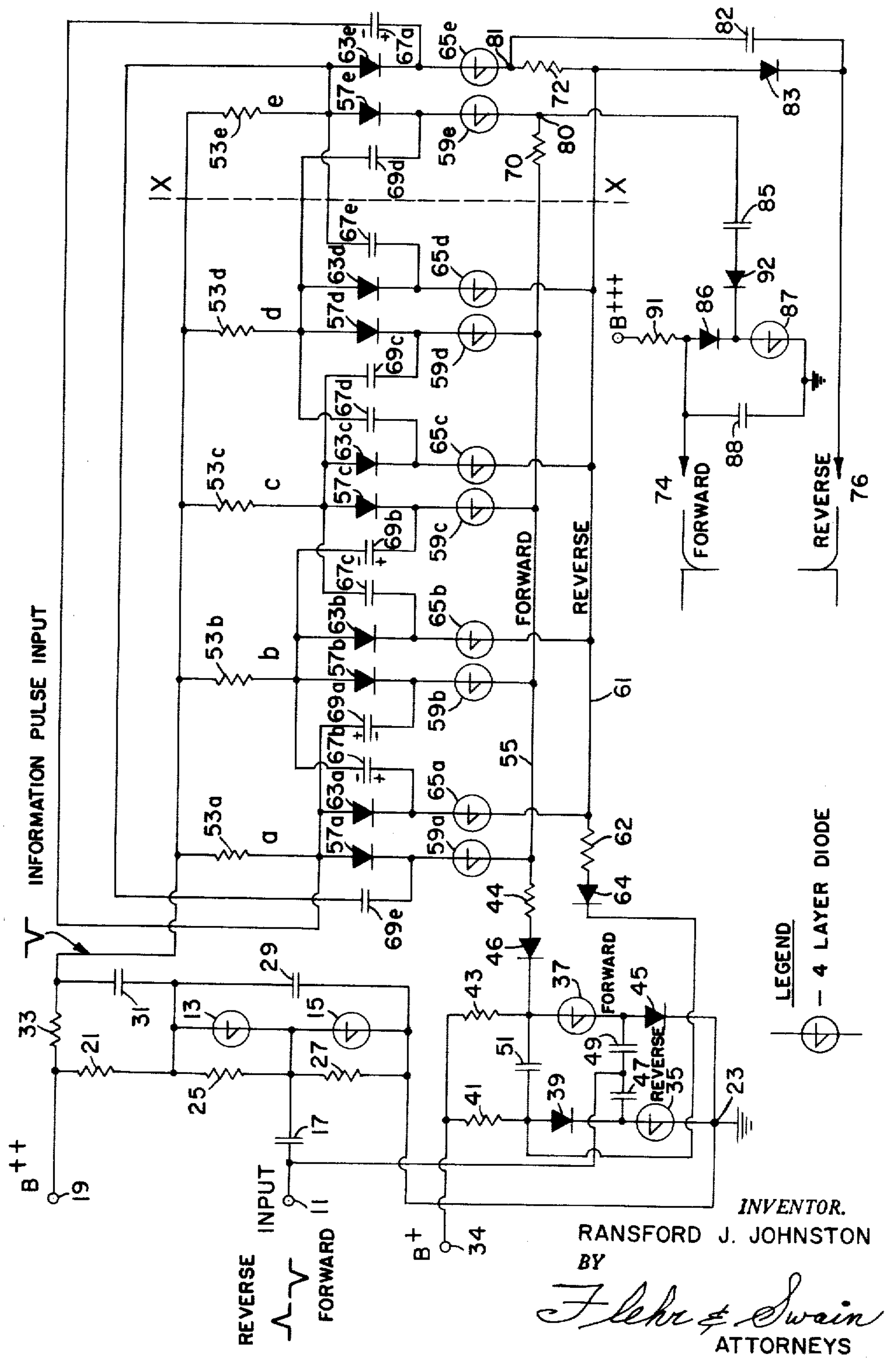
*INVENTOR.*
RANSFORD J. JOHNSTON
*BY*
Flehr & Swain
ATTORNEYS United States Patent Office 3,105,912
Patented Oct. 1, 1963

3,105,912

REVERSIBLE COUNTER WITH SINGLE INPUT THE POLARITY OF WHICH DETERMINES DIRECTION OF COUNT

Ransford J. Johnston, Sunnyvale, Calif., assignor, by mesne assignments, to Clevite Corporation, Cleveland, Ohio, a corporation of Ohio Filed Jan. 8, 1960, Ser. No. 1,339
9 Claims. (Cl. 307—88.5)

This invention relates to ring counters and more particularly to ring counters of the reversible type.

The use of ring counters is well known in the electronic and computer arts. These counters are used in numerous circuits including adders and memories for digital systems. In their usual operation, pulses applied at the input cause subsequent stages of the counter to be operated and hence the number of input pulses can be readily determined. In reversible type ring counters, not only can the number of pulses be used to cause subsequent stages to be operated, but pulses can also be utilized to reverse the process wherein preceding stages are caused to be operated. Ordinarily such reversible type operation is obtained by the use of two separate input signals, one which causes operation in a forward fashion and the second which causes operation in a reverse fashion.

It is a general object of this invention to provide an improvement in reversible counters.

It is another object of this invention to provide a reversible counter wherein forward and reverse counting is obtained from a single input.

It is a further object of this invention to provide a reversible counter with a single input having positive and negative pulses causing forward and reverse counting.

It is another object of the present invention to provide a reversible counter having a plurality of stages in which an energized stage conditions the next succeeding and next preceding stages, so that one or the other is energized in response to the next input signal.

Generally, the objects of the invention are accomplished by employing a plurality of counter stages, each of which, in its energized state, preconditions a preceding and a succeeding stage for subsequent energization. Each stage employs parallel conducting paths, conduction through either of which comprises energization of that stage. One current path of each stage is coupled to a first line while the other current path is coupled to a second line. Each of the stages is further connected to a third line which is energized on the application of an input pulse of either polarity. Means are further included, responsive to the polarity of the input pulse, for connecting either the first or the second line to ground whereby a count in either the forward or reversed direction is accomplished.

These and other objects of the invention will become more clearly apparent upon reading the following description in conjunction with the accompanying drawing of which the single FIGURE is a schematic diagram of one embodiment of this invention.

Referring to the figure, an input terminal 11 is coupled to the junction of two four layer diodes 13 and 15, through a capacitor 17. The use of four layer diodes in this instance and throughout the description is exemplary and may be replaced by other devices which have a high impedance-low current characteristic and a low impedance-high current characteristic and in which a relatively high initiating voltage is required causing the device to switch from the high impedance to the low impedance state and which reverts to the high impedance state when the current drops below a holding value.

A source of positive potential 19 is coupled to the diodes 13 and 15 through a resistor 21. The other side of the diodes 13 and 15 is returned to ground at 23. The resistors 25 and 27 are individually connected across the diodes 13 and 15 respectively, while the capacitor 29 is connected across both diodes 13 and 15. The junction of the diode 13 with the capacitor 29 is connected to the source of positive potential 19 through the series parallel combination of capacitor 31 and the resistors 21 and 33.

Another source of positive potential 34 is applied to a bistable flip-flop including the four layer diodes 35 and 37. The diode 35 is coupled to the source of positive potential 34 through the conventional diode 39 and the resistor 41 while the diode 37 is coupled to the source of positive potential 34 through the resistor 43. The other side of the diode 35 is tied to ground while the other side of the diode 37 is connected to ground through the conventional diode 45. The junction of the diode 35 with the diode 39 is coupled to the junction of the diode 37 with the diode 45 through the capacitors 47 and 49. The junction of the capacitors 47 and 49 is connected to the input terminal 11.

The junction of the diode 39 with the resistor 41 is coupled to the junction of the diode 37 with the resistor 43 through the capacitor 51.

The junction of the capacitor 31 with the resistor 33 is connected to the several stages *a–e* through load resistors 53. The stages *a–e* have similar construction and like reference numerals are used with the stage denominating letters *a–e* used as a suffix. A line 55 is connected to the junction of the diode 37 with the resistor 43 through the resistor 44 and the conventional diode 46. Series diode combinations including the conventional diodes 57 and the four layer diodes 59 are connected between the load resistors 53 and the line 55. A line 61 is connected to the junction of resistor 41 with the diode 39 through the resistor 62 and the conventional diode 64. Series diode combinations including the conventional diodes 63 and the four layer diodes 65 are connected between the load resistors 53 and the line 61.

Each stage is coupled to its preceding stage by a capacitor 67 and to its succeeding stages by a capacitor 69. Small resistors 70 and 72 may be inserted in stage *e* to provide positive outputs 74 and 76.

Although in the embodiment shown there are five stages to the counter, additional stages may be added along the line *x*—*x* in accordance with particular requirements of the desired circuit. Conversely, several of the stages may be omitted from the preferred embodiment shown in the figure.

In operation either positive or negative input pulses are applied at the terminal 11. The value of the resistor 21 is chosen such that the source of potential 19 will not provide a holding current for the diodes 13 and 15. Consequently, after they have once been fired by the pulses at the terminal 11 and the capacitors 31 and 29 are discharged, the diodes 13 and 15 are both non-conducting.

More particularly, upon the application of a positive pulse at the input terminal, the diode 15 will see initiating voltage causing it to switch to the lower impedance state and it will conduct through the series parallel combination including resistors 21, 33 and capacitor 31 and the series resistor 25 to ground terminal 23. When diode 15 is conducting, current through resistor 25 increases and the increased voltage drop plus the fact that one terminal of diode 13 is now essentially at ground potential causes diode 13 to see initiating voltage and it also switches to the low impedance state. This effectively places the point of connection between resistors 21, 25, capacitors 31, 29 and diode 13, at ground potential allowing capacitors 31 and 29 to discharge. Since resistor 21 will not supply holding current, upon discharge of capacitors 29 and 31, diodes 13 and 15 revert to the high impedance state. Upon the application of a negative pulse at terminal 11, the diode 13 sees initiating voltage and switches to the low impedance state thereby conducting through the series parallel combination of resistors 21, 33, capacitor 31 and the series resistor 27 to ground terminal 23. When diode 13 conducts, current through resistor 27 increases and diode 15 sees initiating voltage causing it to switch to the lower impedance state. It is now obvious that the application of a pulse, either positive or negative, at the input terminal 11 will cause diodes 13 and 15 to turn on and discharge capacitors 31 and 29.

Additionally the application of a pulse at the input terminal 11 will be applied to the bistable multivibrator including the diodes 35 and 37 in order to disable either the diodes 59*a–e* or the diodes 65*a–e* and shortly determine a mode of operation. The application of a positive pulse will cause conduction through the resistor 41 and the diodes 39 and 35, to the ground terminal 23. If the diode 35 is already in a conducting or low impedance state, the application of additional positive pulses will not alter the operation.

If the diode 35 is in the conducting state, the application of a negative pulse at the input terminal 11 will cause the diode 37 to see initiating voltage and begin conduction. When diode 37 begins conduction capacitor 51 discharges through diodes 37 and 45 to ground terminal 23, causing diode 35 to revert to the high impedance state because of momentary lack of sufficient holding current during the discharge of capacitor 51. Application of a negative pulse then would cause a change of state from conduction through the diode 35 to conduction through the diode 37. It should be noted that each of the resistors 41 and 43 will pass a current sufficient to maintain its respective diode 35 or 37 in conduction once diode conduction has commenced.

It is apparent that conduction of the diode 35 will effectively connect the line 61 to the ground terminal 23 thereby permitting conduction of the diodes 65*a–e* while at the same time the non-conduction of the diode 37 will disable the diode 59*a–e*. Conversely, it is apparent that conduction of thed iode 37 will connect the line 55 to the ground terminal 23.

Assuming then that the diode 35 is in its conducting state, either of the diodes 65*a–e* can also conduct while the diodes 59*a–e* are inoperable. The converse is, of course, true if the diode 37 is conducting. By way of example, assume that the diodes 37 and 59b are conducting. With the diode 59b conducting, the capacitors 67b, 69a and 69b are charged as shown. Thus a positive potential is applied to one side of each of the diodes 65*a* and 59*c*. These diodes may then be said to be preconditioned since a portion of the necessary voltage for their breakdown is applied. Upon the application of a negative pulse at the input terminal 11, the diode 37 will continue to conduct and diode 35 will remain in the high impedance state. The negative pulse is also applied to diode 13 through capacitor 17 causing diodes 13 and 15 to switch to the low impedance state, thereby, discharging capacitors 31 and 29. As capacitor 31 discharges through diodes 13 and 15 to ground terminal 23, it momentarily pulls the B+ line connecting resistor 33 with resistors 53*a–e* to a value near ground potential thereby initiating an operation As this B+ line is near ground potential, capacitor 69*a* is partly discharged through resistor 53*a* and diode 59*b* reverts to the high impedance or "off" state because it momentarily lacks sufficient holding current. As soon as capacitor 31 has discharged to a point of equilibrium or diodes 13 and 15 revert to the high impedance state, the potential on the line connecting resistor 33 with resistors 53*a–e* begins to rise exponentially toward B++ However, before it reaches this value the preconditioning charge on capacitor 69*b* added to the rising B+ potential causes diode 59*c* to be first to see initiating potential and it therefore switches to low impedance and conducts through diode 37 to ground terminal 23 thereby completing the operation. During the time the potential was rising capacitor 67*b* has no effect because diode 65*a* does not have a path to ground, and capacitor 69*a* in addition to being partly discharged previously can have no effect on diode 59*a* because of diode 57*a*. As soon as any diode 59*a–e* or 65*a–e* sees initiating voltage and switches to the low impedance state, it conducts nearly all the current available and no other diode in the circuit can switch to the low impedance state until the same conditions exist for it which have caused the conducting diode to switch to the low impedance state.

Assuming the same initial conduction, if a positive pulse rather than a negative pulse, has been applied, the diode 35 will begin to conduct and the diode 37 will revert to the high impedance state. Consequently, there will no longer be a path to ground for the diodes 59*a–e*, whereas a path to ground will be provided for the diodes 65*a–e* through the diode 35. Now, under the same conditions as above except for diode 35 being the conducting diode instead of diode 37, as the potential rises diode 65*a* is first to see initiating potential and switches to the low impedance state and conducts through diode 35 to ground terminal 23. As before, capacitor 69*a* is already partly discharged and capacitor 69*b* has no effect because diode 59*c* does not have a path to ground. Thus the mode of operation determined by a positive input pulse is opposite to that determined by a negative input pulse. For purposes of convention, the negative pulse input may be said to determine a forward mode of operation while the positive pulse input may be said to determine a reverse mode of operation.

Output pulses for driving subsequent counters may be obtained from the outputs 74 or 76. As shown, the output 74 associated with the diode 59*e* is used to obtain a negative pulse while the output 76 associated with the diode 65*e* is used to obtain a positive pulse. It is apparent that the polarities may be reversed or that the outputs may be associated with any of the stages *a–e*.

Since the output of the counter at the points 80 and 81 are not necessarily at constant rate, pulse shaping networks are utilized. It is noted that the voltage at points 80 and 81 rises to a definite value when the respective diodes 59*e* or 65*e* turn on. The potential at these points remains at this value until the associated diode turns off, which may in some instances be several minutes or even longer.

Assuming a rise in voltage at point 81, a pulse appears at the output 76 due to the charge of the capacitor 82. The diode 83 is utilized to eliminate a subsequent negative pulse at the output 76 when the diode 65*e* is turned off and the potential at point 81 drops. Regardless of the time that diode 65*e* is on, a single positive pulse is produced at the output 76 as the diode is turned on.

Since a negative pulse is desired at the output 74, additional circuit components are utilized. Again when the diode 59*e* turns on, the potential at point 80 rises sharply and remains at full value until the diode 59*e* is again turned off. The capacitor 85 serves to deliver a sharp positive pulse to the point 86 causing the diode 87 to see initiating voltage and switch on. With diode 87 on, the capacitor 88 discharges through the diodes 86 and 87. The value of resistor 91 is chosen such that, in conjunction with the voltage B+++, holding current cannot be supplied to diode 87 after the capacitor 88 discharges. Consequently, when capacitor 88 discharges diode 87 reverts to its high impedance or "off" state. The diode 92 prevents any significant effect at point 86 when the diode 59*e* turns off. The output pulse exhibited at the output 76 is therefore a sharp negative pulse which occurs when diode 59*e* turns on.

It is apparent that the application of a negative pulse causes a subsequent stage to be activated whereas the application of a positive pulse causes a preceding stage to be activated. Subsequent positive pulses will cause the counter to excite preceding stages whereas subsequent negative pulses will cause the counter to excite succeeding stages.

The components listed below designate an example of one circuit in accordance with the above invention:

Voltages:

| | |
|---|---|
| B+ | 125± 25 volts nominal |
| B++ | 250± 25 volts nominal |
| B+++ | 45 volts |

Diodes:

| | |
|---|---|
| **13**, **15**, **59***a–e* and **65***a–e* | Shockley four layer diode type D switching voltage 100±10 volts. Holding currents. 10 volts. holding current. 10–15 at maximum ambient temperatures. |
| **35** and **37** | Shockley four layer diode type D switching voltage 200±20 volts. Holding current 10–15 ma. |
| **39**, **45**, **46**, **57***a–e*, **63***a–e*, **64** | IN484, IN485 or IN804. |

Resistors:

| | |
|---|---|
| **21** | 100K |
| **25** | 82K |
| **27** | 82K |
| **33** | 10K ohms 10 watt |
| **41** | 8.2L ohms |
| **43** | 8.2K ohms |
| **44** | 30–100 ohms |
| **53***a–e* | 2.2K ohms |
| **62** | 30–100 ohms |
| **70** | 30–500 ohms |
| **72** | 30–500 ohms |
| **91** | 1 megohm |

Capacitors:

| | |
|---|---|
| **17** | .005 microfarads |
| **29** | .01 microfarads |
| **31** | .01 microfarads |
| **47** | .005 microfarads |
| **49** | .005 microfarads |
| **51** | .005 microfarads |
| **67***a–e* | .005 microfarads |
| **69***a–e* | .005 microfarads |
| **82** | .01 microfarads |
| **85** | .01 microfarads |
| **88** | .01 microfarads |

I claim:

1. A counter comprising a first supply line and a second and third supply lines, a plurality of counter stages each including a first and a second device of the type having a low current-high impedance state and a high current-low impedance state, said first devices being coupled between said first supply line and said second supply line, said second devices being coupled between said first supply line and said third supply line, means associated with each said stage, when energized, for preconditioning a preceding and a succeeding stage, means for determining a mode of operation associated with said second and third lines, and means associated with said first line for initiating an operation.

2. A counter as described in claim 1 wherein said first and second devices are four layer diodes.

3. A pulse counter comprising a plurality of counter stages, each of said stages including a first and a second variable impedance device, a first current path connected to each of said first variable impedances, a second current path connected to each of said second variable impedances, means associated with each said stage for preconditioning a preceding and a succeeding stage, means responsive to said pulses for opening one of said current paths and means responsive to said pulses for initiating an operation.

4. A counter as described in claim 3 wherein said variable impedance devices are of the type having a high and a low impedance state, and which switch to said low impedance state upon application of a predetermined voltage and which maintain said low impedance state with passage of a predetermined current.

5. A counter as described in claim 3 wherein said variable impedance devices are four layer diodes.

6. A pulse counter comprising a plurality of counter stages, each of said stages including a first and a second current path, each of said current paths including a variable impedance device, disabling means selectively coupled to said first and said second variable impedance devices, said disabling means including means for opening at least one of said current paths, means for preconditioning a preceding and succeeding stage to be operated, said preceding stage being associated with one of said first impedance devices and said succeeding stage being associated with one of said second impedance devices, and means tending to initiate operation of all said impedance devices in response to the pulses to be counted.

7. A counter as described in claim 6 wherein said variable impedance devices are of the type having a high impedance and a low impedance state, and which switch to said low impedance state upon the application of a predetermined voltage and which maintain said low impedance state with passage of a pre-determined current.

8. A counter as described in claim 6 wherein said variable impedance devices are four layer diodes.

9. A counter as described in claim 6 wherein said disabling means is selectively coupled to said first and said second variable impedance devices in accordance with the polarity of the pulses to be counted.

References Cited in the file of this patent

UNITED STATES PATENTS

| | | |
|---|---|---|
| 2,876,365 | Slusser | Mar. 3, 1959 |
| 2,880,934 | Bensky et al. | Apr. 7, 1959 |
| 2,912,598 | Shockley | Nov. 10, 1959 |

OTHER REFERENCES

The Four-Layer Diode, by Shockley, Electronic Industries & Tele-Tech., August 1957, pages 58–60 and 161–165.

UNITED STATES PATENT OFFICE

CERTIFICATE OF CORRECTION

Patent No. 3,105,912 October 1, 1963

Ransford J. Johnston

It is hereby certified that error appears in the above numbered patent requiring correction and that the said Letters Patent should read as corrected below.

Column 3, line 42, for "thed iode" read -- the diode --; column 5, line 17, for "currents." read -- current --; line 18, strike out "10 volts. holding current.".

Signed and sealed this 14th day of April 1964.

(SEAL)
Attest:
ERNEST W. SWIDER

Attesting Officer

EDWARD J. BRENNER

Commissioner of Patents